United States Patent [19]

Taylor

[11] Patent Number: 5,657,960
[45] Date of Patent: Aug. 19, 1997

[54] PINCH VALVE

[75] Inventor: David John Buchanan Taylor, New South Wales, Australia

[73] Assignee: Jindex PTY. Limited, Sydney, Australia

[21] Appl. No.: 449,914

[22] Filed: May 25, 1995

[30] Foreign Application Priority Data

May 26, 1994 [AU] Australia .................... PM5888

[51] Int. Cl.⁶ ........................................ F16K 7/06
[52] U.S. Cl. ........................................ 251/7; 251/4
[58] Field of Search ...................... 251/4, 5, 7, 8

[56] References Cited

U.S. PATENT DOCUMENTS 2,212,733   8/1940   Grigsby .................... 251/8
3,197,173   7/1965   Taubenheim .................... 251/7

Primary Examiner—John C. Fox
Attorney, Agent, or Firm—Leydig, Voit & Mayer

[57] ABSTRACT

A pinch valve (10) comprising a flexible sleeve (12) adapted for attachment to a conduit in communication with a source of fluid, pinching means (26) adapted to pinch the flexible sleeve (12) and thereby reduce the effective cross-sectional flow area thereof, actuation means (28) operable selectively on said pinching means (26) to regulate fluid flow through the sleeve (12) and mounting means (42) disposed to support the actuation means (28) independently of the sleeve (12) and thereby to permit removal of the sleeve (12) without removal of the actuation means (26).

23 Claims, 6 Drawing Sheets 5,657,960

PINCH VALVE

The present invention relates generally to valves and more particularly to pinch valves.

Pinch valves typically comprise a flexible resilient tubular sleeve forming part of a conduit through which a fluid to be regulated flows. The sleeve is normally joined at either end to adjacent sections of pipe by complementary flanges. A pair of pinch bars are normally disposed on opposite sides of the tube and are progressively drawn together by an actuator to pinch the sleeve and thereby regulate fluid flow through the valve. Alternatively, the flexible sleeve can be surrounded by a valve body which is sealed around the sleeve. To pinch the sleeve, liquid or gas, of a higher pressure than that in the sleeve, is introduced into the valve body which reduces the effective cross sectional flow area of the sleeve and, thus, regulates fluid flow through the valve.

Pinch valves thereby provide a fully sealed enclosure and for this reason are often used in applications requiring the fluid to be isolated from the valve actuation mechanism or from the surrounding environment. They are therefore ideally suited for use with gases, abrasive slurries, corrosive chemicals, toxins and particulate substances, in both dry and wet processes. Pinch valves and are also particularly popular because of their relatively low cost, low flow resistance, low maintenance, high resistance to corrosion and resistance to leakage.

A major problem encountered with the use of pinch valves, however, is that the flexible sleeves inevitably become worn or damaged for a variety of reasons including prolonged use, frictional wear from abrasive fluids, chemical decomposition from corrosive liquids, reduction in elasticity through perishing or other causes, and mechanical damage from the pinch bars themselves. A particularly common problem is that the sleeves lose their initial elasticity and so do not return to a fully relaxed configuration upon release of the pinch bars or pressurised fluid, thereby permanently restricting fluid flow through the valve.

In any case, a combination of some or all of these factors eventually necessitates repair or replacement of the flexible sleeve. This procedure is significantly complicated, however, because the actuator pinch bars and/or valve body must be completely removed from the adjoining pipework in order to permit removal of the sleeve. This difficulty is exacerbated in applications where these components are heavy and difficult to move (as is normally the case), or are installed in confined or relatively inaccessible locations.

It is an object of the present invention to overcome or ameliorate at least some of these deficiencies of the prior art.

Accordingly, the invention provides a pinch valve comprising:

a flexible sleeve adapted for attachment to a conduit in communication with a source of fluid;

pinching means adapted to pinch the flexible sleeve and thereby reduce the effective cross-sectional flow area thereof;

actuation means operable selectively on said pinching means thereby to regulate fluid flow through the sleeve; and mounting means disposed to support the actuation means substantially independently of the sleeve and thereby to permit removal of the sleeve without removal of the actuation means.

Preferably, the pinching means takes the form of a pair of pinch bars disposed on opposite sides of the flexible sleeve. In a particularly preferred embodiment, at least one of the pinch bars is releasably connected directly to the actuation means to facilitate removal and replacement of the sleeve by removal of that pinch bar only.

Preferably, the actuation means includes an hydraulic actuator, and limit switches to indicate the position of the actuator at the open and closed positions of the valve.

In a particularly preferred embodiment, the flexible sleeve is coaxially interposed between adjacent pipe sections in a fluid pipeline by flanges disposed at either end of the sleeve and engagable with respective complementary flanges formed in the adjacent pipe ends.

Preferably, the mounting means are removably attached to at least one of the pipe flanges, independently of the sleeve.

In another embodiment, the flexible sleeve is surrounded by a generally tubular concentric valve body. The valve body is preferably longitudinally split into upper and lower halves, to allow access to the sleeve.

Preferably, the mounting means are adapted to be supported by the upper valve body portion, independently of the sleeve. This permits access to and removal of the sleeve by removing the lower body portion, wish the actuator in-situ.

Desirably, the valve body halves include circumferential slots, to allow the pinch bars to pinch the flexible sleeve within the valve body.

In a further embodiment, the valve body is preferably sealed with respect to the sleeve exterior and the pinching means may be a fluid or gas, of higher pressure than that in the flexible sleeve, forced into the sealed valve body to reduce the effective cross sectional flow area of the sleeve.

In this embodiment, the actuation means includes an inlet port formed in the valve body for introducing said pressurised liquid or gas.

Preferably, the pipe is connected to the upper valve body which is supported by the mounting means. Desirably, the lower valve body is longitudinally hinged to one side to the upper valve body.

Preferred embodiments of the invention will now be described, by way of example only, with reference to the accompanying drawings in which.

Figure 1:
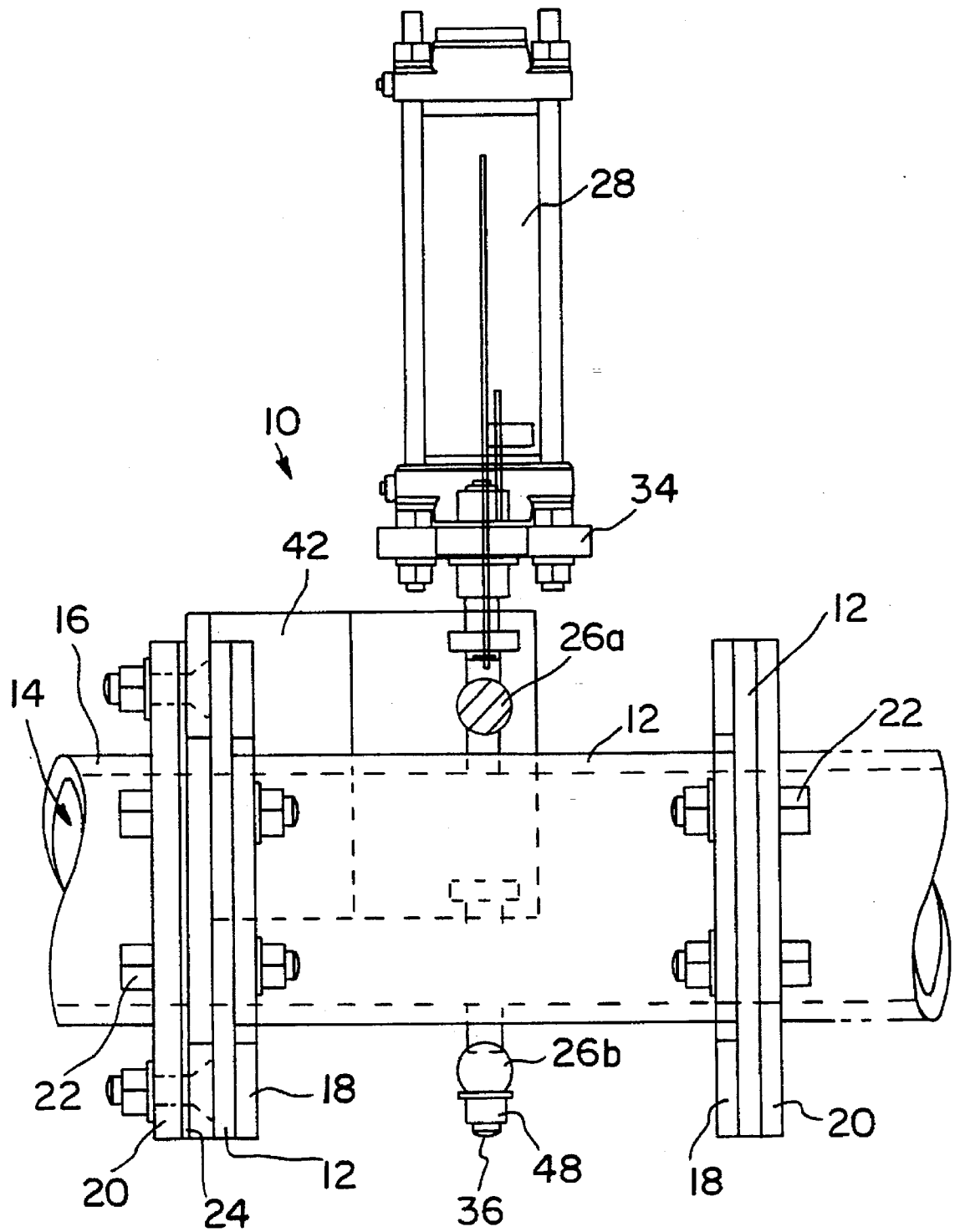
FIG. 1 is a sectional side view of a pinch valve according to a first embodiment of the invention.

Referring to FIG. 1, there is shown a first embodiment of a pinch valve according to the invention wherein pinch valve 10 comprising a flexible sleeve 12 is coaxially interposed between adjacent pipe sections 16 in a pipeline. Split flanges 18 are provided either end of the sleeve and are connected to corresponding flanges 20 of respective pipe sections 16 via bolts 22.

Figure 2:
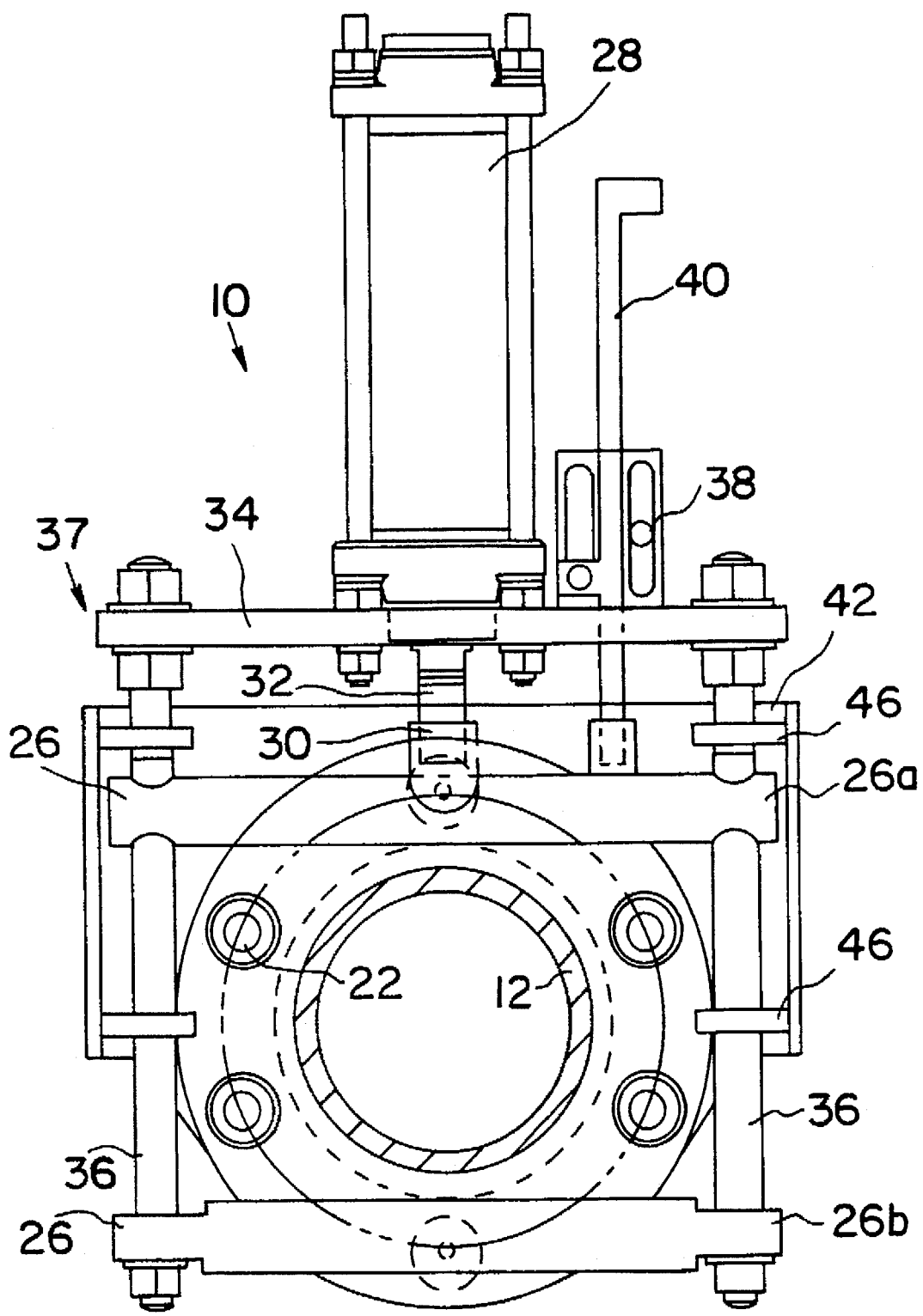
FIG. 2 is a front view of the pinch valve shown in FIG. 1.
Figure 3:
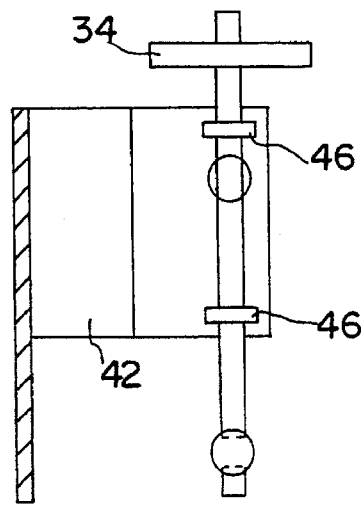
FIG. 3 is a plan view of a mounting bracket forming part of the pinch valve assembly shown in FIGS. 1 and 2.
Figure 4:
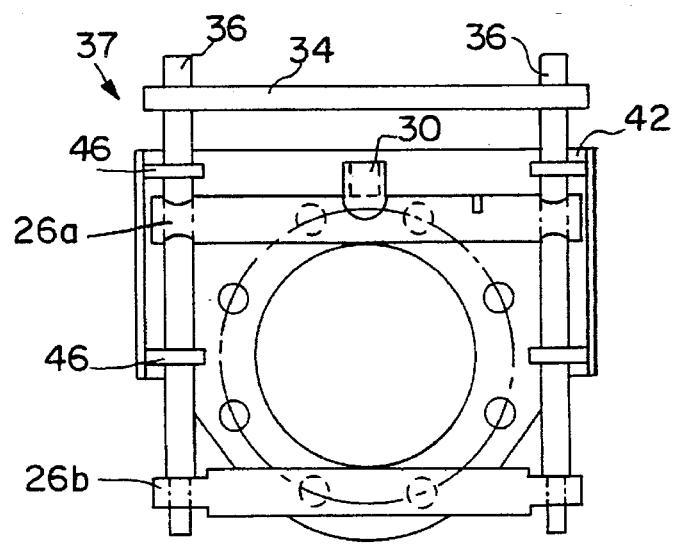
FIG. 4 is a sectional side view of the mounting bracket shown in FIG. 3, including the pinch bar assembly.
Figure 5:
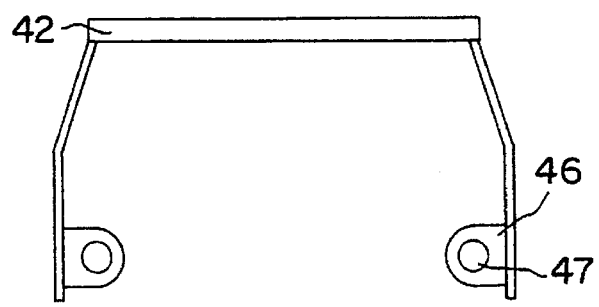
FIG. 5 is a front view of the mounting bracket and pinch bar assembly of FIG. 4.

As best shown in FIG. 2, pinching means 26 are provided in the form of a pair of pinch bars 26a and 26b disposed on opposite sides of the flexible sleeve. The pinch bars are adapted to pinch the flexible sleeve 12 and thereby reduce its effective cross-sectional flow area to effect progressive valve closure.

The pinch bars are drawn together by actuation means, which comprise a pneumatic piston and cylinder assembly 28 connected to the upper pinch bar 26a via yoke 30 located an the terminal end of the piston rod or shaft 32.

The actuator 28 is bolted to support plate 34 which in turn is fixedly attached to the lower pinch bar 26b by shafts 36. The upper pinch bar 26a is slidably located on the shafts 36. The support plate 34 further includes optional limit switches 38 actuated by a trigger mechanism 40 attached to the upper pinch bar 26a. This indicates the open and closed positions of the valve and also prevents movement of the actuator beyond these positions.

The apparatus further includes mounting means, in the form of mounting bracket 42, which is fixedly connected to the remote side of the pipeline flange 20 via countersunk bolts 44. Generally, a gasket 24 or other such sealing medium is provided between respective mating flanges 42 and 20. The mounting bracket 42 includes two pairs of vertically spaced lugs 46, each pair incorporating respective vertically aligned apertures 47 which slidably locate shafts 36. Thus, it will be appreciated that the support plate 34, shafts 36, and lower pinch bar 26b together form a rigid rectangular sub-assembly 37 which floats vertically, relative to the fixed mounting bracket 42 and the sliding upper pinch bar 26a. In this way, the mounting bracket 42 supports the pneumatic actuator independently of the flexible sleeve 12.

To effect closure of the pinch valve 10, air under pressure is supplied to the actuator 28, which forces the shaft 32, yoke 30 and hence the upper pinch bar 26a away from the support plate 34. This movement is accommodated by the upper pinch bar 26a sliding downwardly along shafts 36. When the upper pinch bar contacts the flexible sleeve, further displacement of the actuator causes the support plate 34 to move upwardly and away from the mounting bracket 42, thereby simultaneously drawing the lower pinch bar 26b upwardly towards the mounting bracket 42.

It will be appreciated that this action and the connection between the sliding upper pinch bar 26a, the fixed mounting bracket 42, and the floating sub-assembly 37 results in the pinch bars progressively moving together and thereby reducing the cross-sectional area of the sleeve in a self-centring manner.

When the actuator 28 is reversed so as to withdraw the shaft 32, the cross-sectional flow area is enlarged by a reverse of the above described process.

To replace she flexible sleeve 12 in this embodiment of the invention, locating nuts 48 are first removed from shafts 36, thus releasing the lower pinch bar 26b from the shafts. Bolts 22 are then removed from flanges 18 and 20, thereby allowing removal of the flexible sleeve. Because the actuator 28 is mounted directly to the pipeline flange 20 by mounting bracket 42 and bolts 44, it can remain in-situ throughout the sleeve removal operation. Installation of a new sleeve is accomplished by the reverse of the above procedure.

Figure 7:
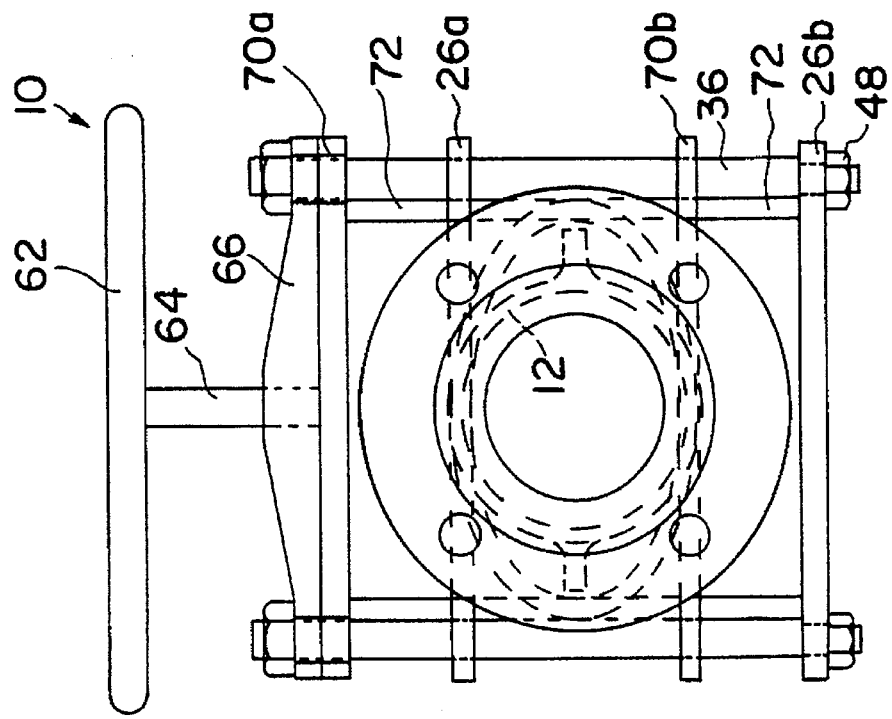
FIG. 7 is a front view of the pinch valve shown in FIG. 6.
Figure 6:
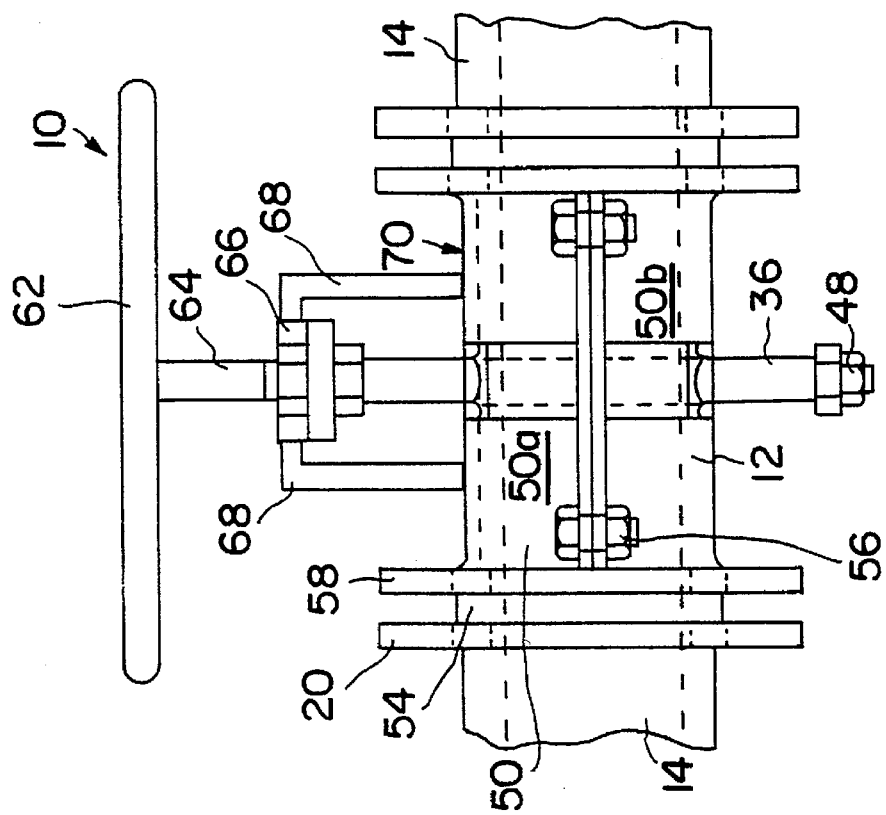
FIG. 6 is a side view of a pinch valve according to a second embodiment of the invention.

A second embodiment of the invention is shown in FIGS. 6 and 7 wherein like numerals are used to designate like features.

In this second embodiment, the flexible sleeve 12 is surrounded by a generally tubular concentric valve body 50. This valve body is split longitudinally into separately cask upper and lower halves 50a and 50b respectively. The cast valve body halves, when viewed in plan, are widest at their central region to accommodate the lateral expansion of the sleeve which occurs during the pinching process. The valve body halves also include respective opposing circumferential slots 52 which allow the pinch bars 26a and 26b to pinch the sleeve 12 in the manner previously described.

In this embodiment, the end flanges 54 of the flexible sleeve are smaller in diameter than the inner diameter defined by the array of the bolts connecting the pipe flanges 20 to valve body flanges 58. Thus, each flange of the flexible sleeve 12 is sandwiched between the corresponding valve body flange 58 and pipe flange 20, to retain the sleeve in position.

The actuation mechanism shown comprises a handwheel 62 with a screw-threaded shaft 64 engaged with a correspondingly threaded handwheel support plate 66. As previously described, pinch bars 26a and 26b slide along shafts 36. However, in this case, the pinch bars ate fixed in relation to upper and lower actuation plates 70a and 70b by spacers 72. Turning handwheel 62 thus results in shaft 64 displacing the upper actuation plate 70a, and hence the upper pinch bar 26a, away from support plate 66. As with the first embodiment, this movement is accommodated by the upper pinch bar 26a sliding downwardly along shafts 36 until the upper pinch bar contacts the flexible sleeve. Further displacement causes the lower actuation plate 70a, and hence the lower pinch bar 26b, to move upwardly into contact with the flexible sleeve 12. Subsequent displacement results in the pinch bars coming together and progressively reducing the cross sectional flow area of the sleeve in the same self-centring manner as previously described.

When the handwheel is rotated in the reverse direction, shaft 64 is withdrawn and the cross sectional flow area is enlarged by a reverse of the above process.

To replace the flexible sleeve in this second embodiment, locating nuts 48 are first removed from shafts 36, thus releasing the lower pinch bar 26b from the shafts. The flange bolts engaging the upper valve body 50a are then loosened and the flange bolts engaging the lower valve body 50b are removed altogether. The bolts 56 connecting the upper valve body to the lower valve body are then removed, allowing the lower valve body to be completely withdrawn to expose the lower half of the sleeve. The sleeve can then be removed from between the pipes.

In addition to removing the lower flange bolts and loosening the upper flange bolts it may sometimes be necessary to force the valve body and pipe flanges apart in order to remove the sleeve. Jacking screws (not shown) may be provided in the flanges to facilitate this forcing apart if required.

In this case, the mounting means takes the form of support legs 68 which extend from support plate 66. During normal operation, the handwheel and pinch bar assembly are supported by the sleeve itself, and the support legs remain raised above the upper surface 70 of the upper valve body. However, these support less are adapted to engage the upper surface 70 of upper valve body portion 50a to support the handwheel and associated actuation components in-situ, whilst the sleeve 12 is being removed.

Installation of a new sleeve is accomplished by a reverse of the above procedure.

Figure 8:
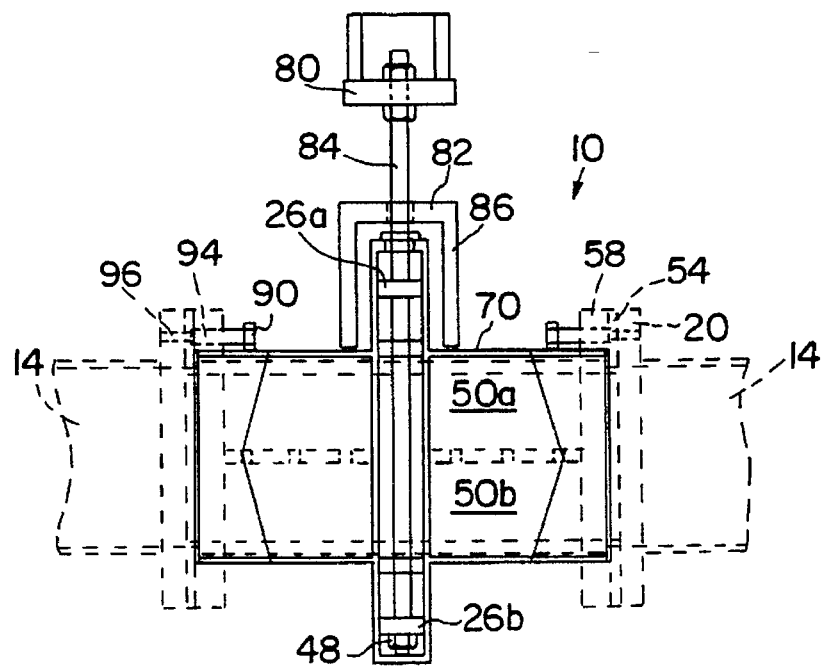
FIG. 8 is a side view of a pinch valve according to a third embodiment of the invention.
Figure 9:
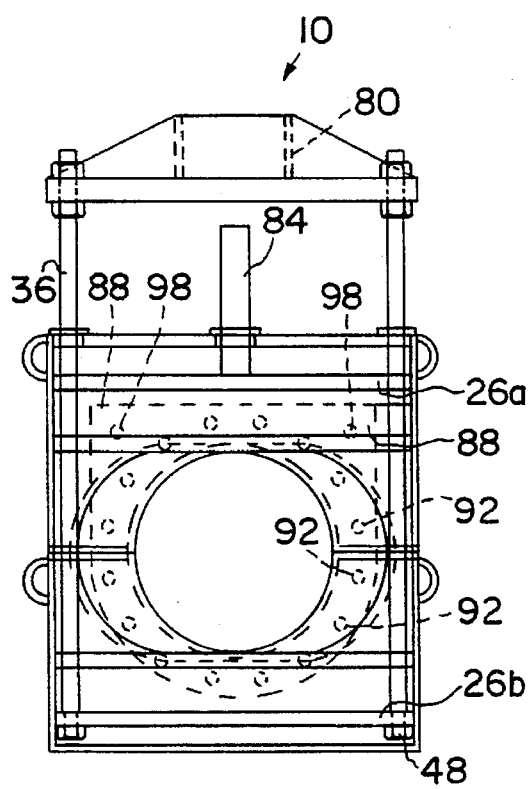
FIG. 9 is a front view of the pinch valve shown in FIG. 8.
Figure 10:
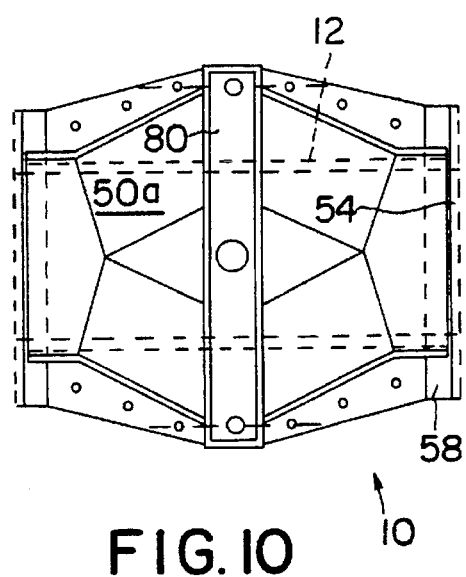
FIG. 10 is a plan view of the pinch valve shown in FIGS. 8 and 9.

Referring to FIGS. 8, 9 and 10 there is shown a third embodiment of the invention. Once again, like numerals are used to designate corresponding features.

This third embodiment is similar to the second in that the flexible sleeve is surrounded by a split valve body. However, as shown, the valve body is fabricated from sheet and pipe sections rather than castings. The upper and lower valve body halves 50a and 50b include respective circumferential slots 52 to allow the I-shaped pinch bars 26a and 26b to pinch the sleeve, and the body portion includes a central bulge to accommodate the consequential lateral expansion, as previously described.

In this case, however, as shown in FIG. 8, the end flanges 54 of the sleeve are the same diameter as the pipe flanges 20 and valve body flanges 58, and are bolted in position as described in relation to the first embodiment.

The actuation mechanism (not shown) such as an hydraulic or pneumatic cylinder or handwheel are connected to support plate 80. The mounting assembly, in the form of support bracket 82, is slidably located on actuation shaft 84 and includes support legs 86. The less 86 locate against the upper surface 70 of upper valve body portion 50a to support the actuation means whilst the sleeve is being removed, as previously described.

In this embodiment, however, the normally circular valve body and pipe flanges are modified to include upper corner portions 88. These corner portions allow the addition of shoulder jacking bolts 90 which will be described in more detail below.

To replace the flexible sleeve in this third embodiment, locating nuts 48 are first removed from shafts 36, thus releasing the lower pinch bar 26b. All the flange bolts from holes 92 are then removed. Finally, the bolts holding the upper and lower valve body halves are removed to allow the lower valve body half to be withdrawn, thus exposing the sleeve.

Although the flange bolts have been removed, the upper valve body is still supported between the pipe flanges by shoulder jacking bolts 90. The threaded end 94 of each of these bolts engages the corresponding corner portion of the upper valve body whilst the plain end 96 is slidably received by a corresponding hole 98 formed in the corner portion of the pipe flange. This bolt configuration holds the upper valve body 50a in position between the pipe flanges whilst the main flange connecting bolts are removed. Additionally, the jacking bolts 90 each have a shoulder 100 which, when the bolts are advanced, serves to locate against the pipe flange and jack it away from the valve body, allowing easier removal of the sleeve.

When the flexible sleeve is removed, the actuation means (not shown) is supported by legs 86 locating against upper valve body portion 50a. The legs thereby support the actuation mechanism throughout the sleeve replacement operation. Once again, installation of a new sleeve is the reverse of the above procedure.

Figure 11:
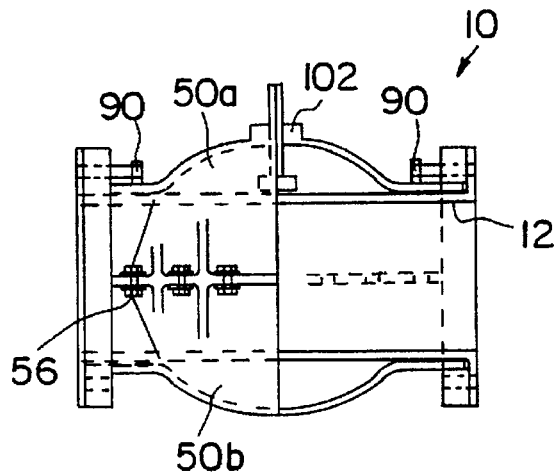
FIG. 11 is a partly sectional side view of a pinch valve according to a fourth embodiment of the invention.
Figure 12:
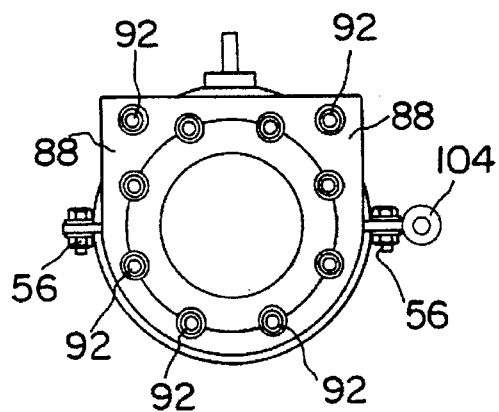
FIG. 12 is a front view of the pinch valve shown in FIG. 11.
Figure 13:
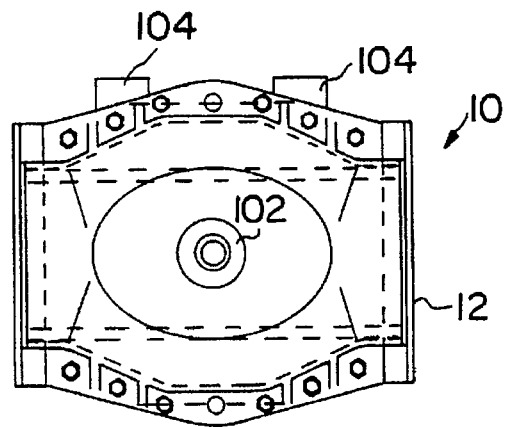
FIG. 13 is a plan view of the pinch valve shown in FIGS. 11 and 12.

A fourth embodiment of the invention is shown in FIGS. 11 to 13. As with previous embodiments numerals are used to designate like features.

This fourth embodiment is similar to the second and third in that the flexible sleeve is surrounded by a split valve body. As in the third embodiment, upper valve body 50a and corresponding pipe flanges each include upper corner portions 88 which receive shoulder jacking bolts 90. However, in this case, the valve body is sealed around the flexible sleeve and the upper valve body includes an inlet port 102 to allow a pressurised liquid or gas into the space between the valve body interior and the flexible sleeve exterior.

The actuation means (not shown) includes a source of pressurised fluid or gas, a pressurised fluid conduit (not shown), an inlet pork 102 and the valve body itself.

To effect closure of the pinch valve, liquid or gas is supplied to the inlet port, at a pressure higher the internal sleeve pressure, thus compressing the effective cross sectional area of sleeve and regulating fluid flow through the valve. Reducing the pressure of the liquid or gas in the valve body results in a reverse of the above process.

To replace a flexible sleeve in this fourth embodiment the pressure is bled from the valve body interior and the flange bolts from holes 92 are removed. The bolts connecting the upper and lower valve body halves are then removed, thus exposing the sleeve.

Although the flange bolts have been removed, the upper valve body is still supported between the pipe flanges by the shoulder jacking bolts 90 described previously.

As best shown in FIGS. 12 and 13, the upper and lower valve body halves are connected by hinges 104. This allows lower valve body 50b to remain in-situ whilst also allowing access to sleeve 12.

When the flexible sleeve is removed, the fluid conduit, inlet port and upper valve body are supported, independent of the sleeve, by shoulder jacking bolts 90. Once again, installation of a new sleeve is the reverse of the above procedure.

It will be appreciated from the descriptions above than the invention provides a pinch valve whereby replacement of the flexible sleeve is far easier, less time consuming, less expensive and safer than is possible in the case of conventional pinch valves. This is because throughout the sleeve replacement operation, in-situ components of the actuation mechanism, which can typically weigh up to several hundred kilograms, remain in the operative position between the pipe flanges. Thus, the invention represents a commercially significant improvement over the prior art.

Although the invention has been described with reference to specific examples, it will be appreciated by those skilled in the art that the invention may be embodied in many other forms.

I claim:

1. A pinch valve comprising:
   a flexible sleeve adapted for attachment to a conduit in communication with a source of fluid;
   pinching means adapted to pinch the flexible sleeve and thereby reduce the effective cross-sectional flow area thereof;
   actuation means operable selectively on said pinching means to regulate fluid flow through the sleeve; and
   mounting means disposed to support the actuation means independently of the sleeve and thereby to permit removal of the sleeve without removal of the actuation means.

2. A pinch valve as claimed in claim 1 wherein the pinching means takes the form of a pair of pinch bars disposed on opposite sides of the flexible sleeve.

3. A pinch valve as claimed in claim 2 wherein at least one of the pinch bars is releasably connected to the actuation means to facilitate removal and replacement of the sleeve.

4. A pinch valve as claimed in claim 1 wherein the flexible sleeve is coaxially interposed between adjacent pipe sections in a fluid pipeline by flanges disposed at either end of the sleeve and engagable with respective complementary flanges formed in the adjacent pipe ends.

5. A pinch valve as claimed in claim 4 wherein the corresponding sleeve and pipe flanges are connected by a peripheral array of bolts.

6. A pinch valve as claimed in claim 4 wherein the mounting means are removably attached to one of the pipe flanges, independently of the sleeve.

7. A pinch valve as claimed in claim 1 wherein the flexible sleeve is surrounded by a generally tubular concentric valve body.

8. A pinch valve as claimed in claim 7 wherein the valve body is longitudinally split into two halves to allow access to the sleeve.

9. A pinch valve as claimed in claim 8 wherein the valve body halves are longitudinally hinged together.

10. A pinch valve as claimed in claim 7 wherein the valve body is sealed around the sleeve.

11. A pinch valve as claimed in claim 10 wherein the pinching means is a pressurised liquid or gas introduced into the valve body.

12. A pinch valve as claimed in claim 11 wherein the actuation means includes an inlet port formed in the valve body for introducing said pressurised liquid or gas.

13. A pinch valve as claimed in claim 7 wherein the valve body includes a centrally located internal bulge to accommodate transverse expansion of the sleeve during pinching.

14. A pinch valve as claimed in claim 7 wherein said valve body includes opposing circumferential slots to accommodate the pinch bars.

15. A pinch valve as claimed in claim 7 wherein the valve body and sleeve are coaxially interposed between adjacent pipe sections in a fluid pipeline, said sleeve having flanges formed in opposite ends thereof, each sleeve flange being sandwiched between surrounding flanges formed respectively on the corresponding ends of the valve body and the adjacent pipe sections.

16. A pinch valve as claimed in claim 15 wherein the corresponding valve body and pipe flanges are releasably clamped together by a peripheral array of bolts.

17. A pinch valve as claimed in claim 16 wherein the bolts are positioned radially outwardly of the flange formed on the flexible sleeve.

18. A pinch valve as claimed in claim 16 wherein the bolts are positioned to pass through the flange formed on the flexible sleeve.

19. A pinch valve as claimed in claim 16 wherein the corresponding flanges of the pipe and valve body include extended corner portions whereby the upper valve body is releasably connected to the pipe flanges independently of said peripheral array of bolts.

20. A pinch valve as claimed in claim 19 wherein said upper valve body is releasably connected to the pipe flanges by a pair of shouldered bolts extending through said extended corner portions.

21. A pinch valve as claimed in claim 7 wherein said mounting means are adapted to engage the valve body, independently of the sleeve.

22. A pinch valve as claimed in claim 1 wherein the actuation means includes an hydraulic or pneumatic actuator, and limit switches to indicate the open and closed positions of the valve.

23. A pinch valve as claimed in claim 1 wherein the actuation means includes an electric motor or a manual handwheel, operating an actuating screw.

* * * * *